No. 612,101. Patented Oct. 11, 1898.
J. A. HEANY.
WHEEL FOR VEHICLES.
(Application filed Mar. 5, 1898.)
(No Model.)
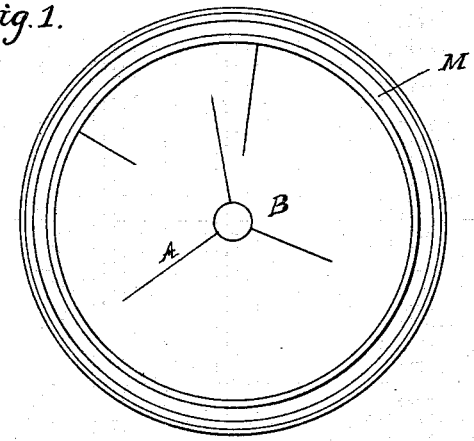
Fig. 1.
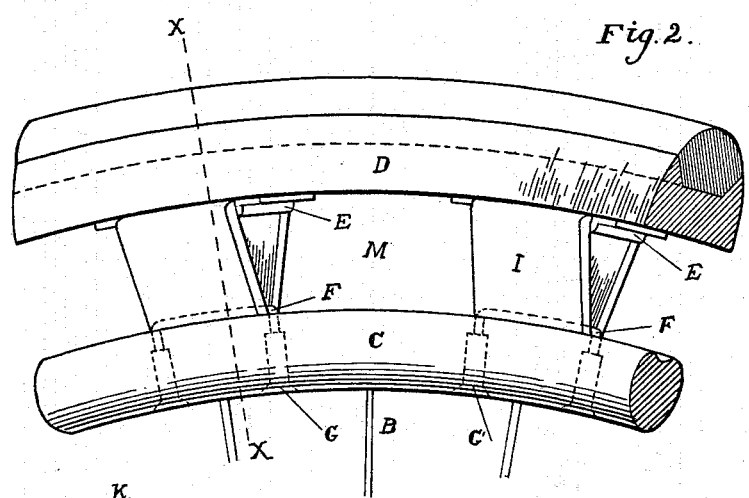
Fig. 2.
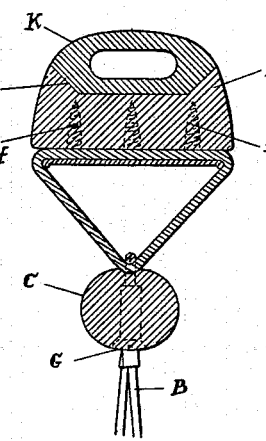
Fig. 3.
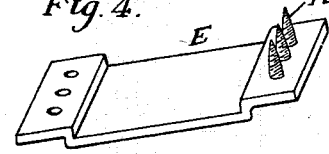
Fig. 4.
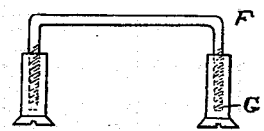
WITNESSES:
M. C. Roberts
Geo. G. Roberts
INVENTOR
John Allen Heany
BY
George E. Buckley
ATTORNEY.
THE NORRIS PETERS CO., PHOTO-LITHO., WASHINGTON, D. C.

UNITED STATES PATENT OFFICE.

JOHN ALLEN HEANY, OF PHILADELPHIA, PENNSYLVANIA.

WHEEL FOR VEHICLES.

SPECIFICATION forming part of Letters Patent No. 612,101, dated October 11, 1898.

Application filed March 5, 1898. Serial No. 672,756. (No model.)

*To all whom it may concern:*

Be it known that I, JOHN ALLEN HEANY, a citizen of the United States, and a resident of Philadelphia, Pennsylvania, have invented certain Improvements in Wheels for Vehicles, of which the following is a description, reference being had to the accompanying drawings, making part hereof.

The nature and object of my invention will appear from the following description and claim.

In the drawings, Figure 1 is a side elevation of a wheel containing my improvement; Fig. 2, an enlarged detached perspective view of a portion of the inner rim and felly, showing the connecting rubber bands, with clamp and screw fastenings; Fig. 3, a cross-sectional view on the line X X of Fig. 2, and Fig. 4 views in perspective and elevation showing two forms of clamp and screw-fastenings for the rubber bands.

A is the hub; B B, the radiating spokes; C, the inner stiff rim, and D the outer stiff rim or felly, both of wood, metal, or other stiff material.

I I are short rings or endless bands of rubber held between rim C and felly D by straddling-clamps F and E, which in turn are secured in place, respectively, by bicycle-screws G G and screws H H. Clamps E are flat and clamps F F are wire clamps, but both are forms of straddling-clamps, as they straddle over (within) the bands I I, and they are secured to the ring and felly, respectively, by screw-threaded devices.

K is an outer rubber tire setting in groove L.

Rim C and felly D are concentric, and vary so much in diameters as to be separated by an open space M.

What I claim as new is—

In a wheel for vehicles, the combination with hub A and spokes B of a stiff rim C, stiff felly D, concentric with and of greater diameter than said rim so as to leave an open space between them; endless bands, or rings I between said rim and felly and straddling-clamps passing through said rings secured to the felly D and rim C respectively by screws substantially as and for the purposes described.

JOHN ALLEN HEANY.

Witnesses:
WM. R. HELLYER,
ANDREW BROGAN.